US 6,535,604 B1

(12) United States Patent
Provencal et al.

(10) Patent No.: US 6,535,604 B1
(45) Date of Patent: Mar. 18, 2003

(54) VOICE-SWITCHING DEVICE AND METHOD FOR MULTIPLE RECEIVERS

(75) Inventors: Paul Provencal, Hull (CA); Christopher M Forrester, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/148,149

(22) Filed: Sep. 4, 1998

(51) Int. Cl.⁷ ................................................. H04B 3/20
(52) U.S. Cl. ............................ 379/388.06; 379/388.05; 379/388.01
(58) Field of Search ...................... 379/406.01, 406.07, 379/406.16, 388.01–388.06, 390.01, 202.01; 381/83

(56) References Cited

U.S. PATENT DOCUMENTS

| | | | |
|---|---|---|---|
| 3,952,166 A | 4/1976 | Kato et al. ............. | 379/390.02 |
| 4,008,376 A * | 2/1977 | Flanagan et al. ....... | 379/206.01 |
| 4,513,177 A | 4/1985 | Nishino et al. ........ | 379/388.06 |
| 4,560,840 A | 12/1985 | Hansen ................... | 379/388.05 |
| 4,901,346 A | 2/1990 | Erving ................... | 379/388.06 |
| 5,007,046 A * | 4/1991 | Erving et al. ............... | 370/249 |
| 5,058,153 A | 10/1991 | Carew et al. .......... | 379/392.01 |

OTHER PUBLICATIONS

A. Busale, Fundamental Considerations in the Design of a Voice–Switched Speakerphone, pp. 265–294, vol. XXXIX, Mar. 1960, No. 2, The Bell System Technical Journal.

* cited by examiner

*Primary Examiner*—Forester W. Isen
*Assistant Examiner*—Daniel Swerdlow
(74) *Attorney, Agent, or Firm*—Jeffrey M. Measures

(57) ABSTRACT

A voice-switching device for use in a telephone terminal which applies an optimal amount of switched loss to a plurality of distinct receive transducers. The voice-switching device detects speech signals on the transmit and receive paths to determine a mode of operation. Based on the mode of operation the device applies optimal amount of loss to the transmit path and each output path separately. This system eliminates excessive attenuation of non-dominant receive transducers as well as optimizes the transition time from active to quiescent mode for all receive transducers.

11 Claims, 2 Drawing Sheets

VOICE-SWITCHING DEVICE AND METHOD FOR MULTIPLE RECEIVERS

FIELD OF THE INVENTION

The present invention relates to voice-switching devices. More particularly, the invention relates to voice-switching devices for use in a telephone terminal.

BACKGROUND TO THE INVENTION

It is well known to enhance the capabilities of a standard telephone terminal by adding a loudspeaker to the receive path of said terminal. However, due to the increased gain requirements in a loudspeaking telephone, a voice-switching device must be incorporated in order to avoid instability. Instability can occur in a terminal where there is strong coupling at the network interface point (e.g. four-to-two wire hybrid) and/or in the loudspeaker-to-microphone path.

Most modem voice-switching devices have three associated operational modes: active receive mode, active transmit mode, and quiescent mode. In active receive mode, a speech signal level on the receive path exceeds those on the transmit path. Similarly, in active transmit mode a speech signal level on the transmit path exceeds those on the receive path. In quiescent mode, no significant speech signals are present on either the transmit or receive path. While in active transmit mode, loss is inserted in the receive channel and removed from the transmit channel. Loss is inserted and removed by varying the amount of attenuation applied to the signal. Conversely, in active receive mode, loss is inserted in the transmit channel and removed from the receive channel. In the quiescent mode, the loss is approximately halved between the transmit and receive channels. The loss which is moved from channel to channel is referred to as "switched-loss". A voice-switching circuit increases the stability margin of the terminal by ensuring some amount of loss exists in either the transmit or receive or both channels at all times.

Prior art speakerphone arrangements (e.g., group listening terminals) have merely applied the same amount of switched loss to all of the output paths. Such a device would include a single receive variolosser (e.g. a programmable attenuator) which would attenuate all of the attached receivers identically. A disadvantage of such an arrangement is that the amount of switched loss which must be applied to the loudspeaker is greater than that which is necessary for the handset receiver—since less acoustic coupling occurs between the handset receiver and microphone than between a loudspeaker and microphone. This results in the handset receiver being excessively attenuated when the terminal is in transmit mode, i.e. it is more difficult for the handset user to hear the far end talker. The discomfort associated with the excessive attenuation is that either party believes the connection has been lost or has difficulty communicating during double-talk conditions (both parties talking simultaneously). Excessive attenuation also leads to increased noise contrast i.e. noise is more easily heard as it increases and decreases due to voice-switching. Furthermore, since the transition time from active (transmit or receive) to quiescent mode (no speech signals present) or from quiescent to active mode is greater for the loudspeaker than the handset speaker, prior art arrangements result in slower than necessary transition times for the handset speaker. This causes discomfort both parties by cutting off the initial speech signal.

SUMMARY OF THE INVENTION

It is an object of the present invention to provide a voice-switching device for applying the optimum amount of switched loss to a plurality of distinct receive transducers independently. A distinct receive transducer is a receive transducer which requires a different amount of switched loss than the other receiver transducer.

According to one aspect of the invention this objective is met by attenuating each output path separately. An output path is herein defined as a receive path to which a plurality of identical receive transducers can be attached. This distinction is made because there is no advantage to applying the same level of switched loss independently to a set of identical receive transducers.

One application of said voice-switching device is for use in a group listening call wherein two distinct receive transducers, e.g. a loudspeaker and a handset speaker, are employed.

According to one embodiment, separate variolossers (attenuators) are attached to the transmit path and the output paths. In response to said device entering into the transmit mode of operation, the switched loss for each output path is calculated and applied independently of the other output paths. Conversely, in response to said device entering into a receive mode of operation, or a quiescent mode of operation, the switched loss for the transmit path is calculated and applied based on the characteristics of the dominant receive transducer. The dominant receive transducer is the receive transducer (or group of identical receive transducers) which provides the greatest amount of coupling to the transmit path.

Ideally this invention will result in the minimum switched loss being applied to each receive transducer thereby providing optimum audio quality and minimal transition times.

One aspect of the present invention provides for a voice-switching device to improve audio quality in a telephone terminal comprising: a transmit path; a receive path; a plurality of output paths; means for sampling the transmit and receive paths in order to identify the presence and magnitude of speech signals; means for determining the mode of operation responsive to sampling the transmit and receive paths; and means for adjusting the amount of switched loss applied to the transmit path and output paths responsive to determining the mode of operation.

It is to be understood that both the foregoing general description and the following detailed description are exemplary and explanatory and are intended to provide further explanation of the invention as claimed.

BRIEF DESCRIPTION OF THE DRAWINGS

The present invention, together with further objects and advantages thereof will be further understood from the following description of the preferred embodiments with reference to the drawings in which.

DETAILED DESCRIPTION OF THE PREFERRED EMBODIMENTS

The present invention will be described with respect to a preferred embodiment used in a group listening terminal. It should be appreciated by a person skilled in the art that the invention can also be utilized in other voice and/or video conferencing devices which incorporate a plurality of distinct receivers.

Figure 1:
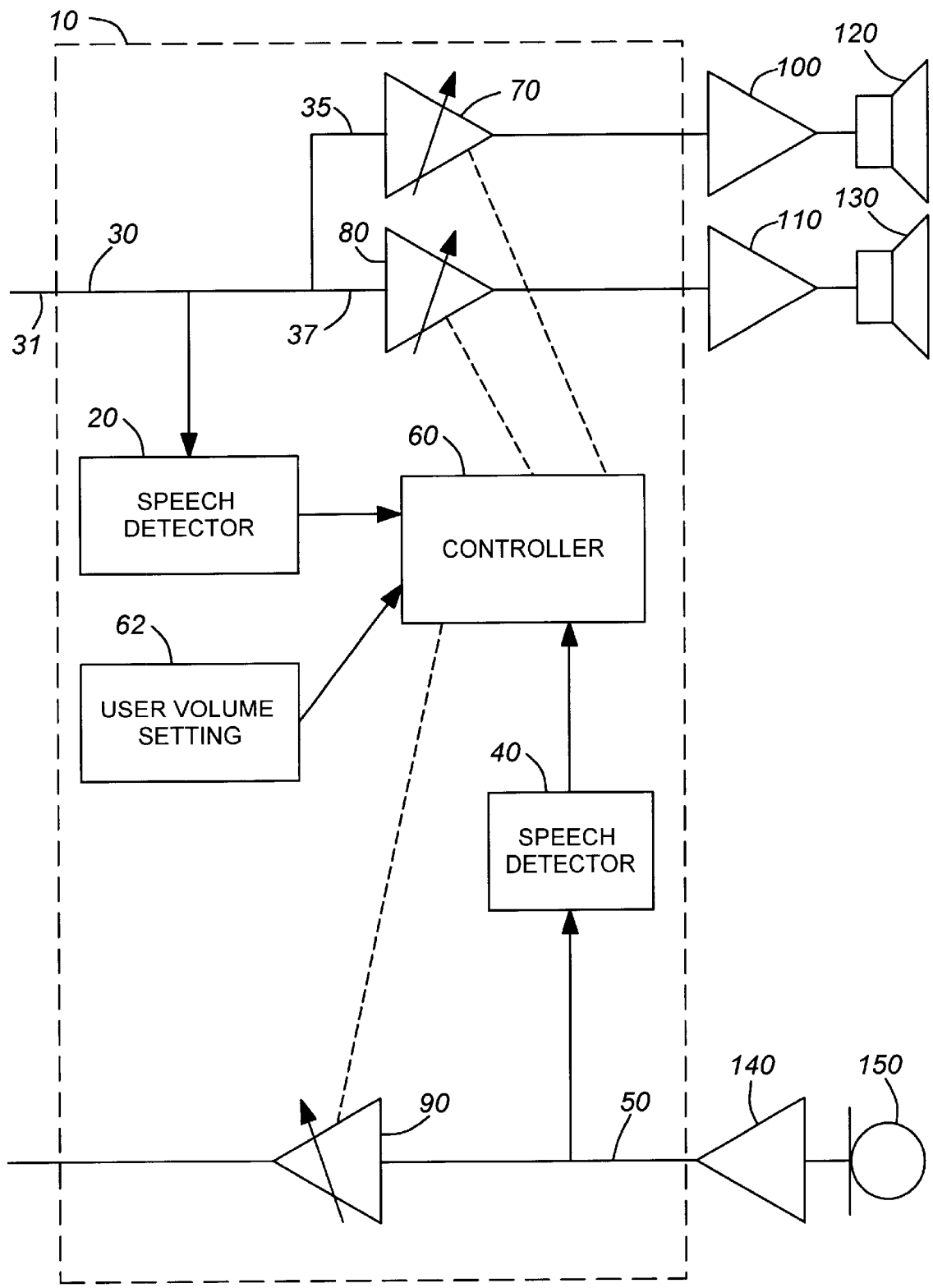
FIG. 1 is block diagram of a terminal including a voice-switching device according to a preferred embodiment of the present invention.

By way of example, FIG. 1 illustrates a voice-switching device 10 according to a preferred embodiment of the invention. In this example, the voice-switching device includes a speech detector 20 attached to a receive path 30, a speech detector 40 attached to a transmit path 50 and a controller 60 for adjusting the multiple variolossers 70, 80, and 90 according to the method described herein. The receive path 30 in this example comprises a connection for receiving a signal 31. Said signal is sampled by speech detector 20, and is then sent to two output paths 35 and 37, which are connected to amplifiers 100 and 110 respectively which are in turn connected to receive transducers 120 and 130 respectively. Each output path includes a variolosser 70 and 80 which is connected to an amplifier 100 and 110 respectively. In this example, a handset receiver 120 and a handsfree receiver (loud speaker) 130 are the distinct receive transducers attached to the voice-switching device. Similarly, variolosser 90 is located after the transmit path 50 and the transmitting amplifier 140. In this example, a handset transmitter (e.g. microphone) 150 is the transmit transducer connected to the transmitting amplifier.

In operation the speech detectors 20 and 40 detect the presence and magnitude of speech signals on the receive and transmit paths 30 and 50 respectively. Based on this information, the controller 60 determines the mode which the voice-switching device is operating in. The controller then uses the information provided by the speech detectors along with information provided from the user volume setting 62 to adjust the amount of loss applied to the transmit and output paths. Said controller adjusts the level of loss by controlling the multiple variolossers.

Figure 2:
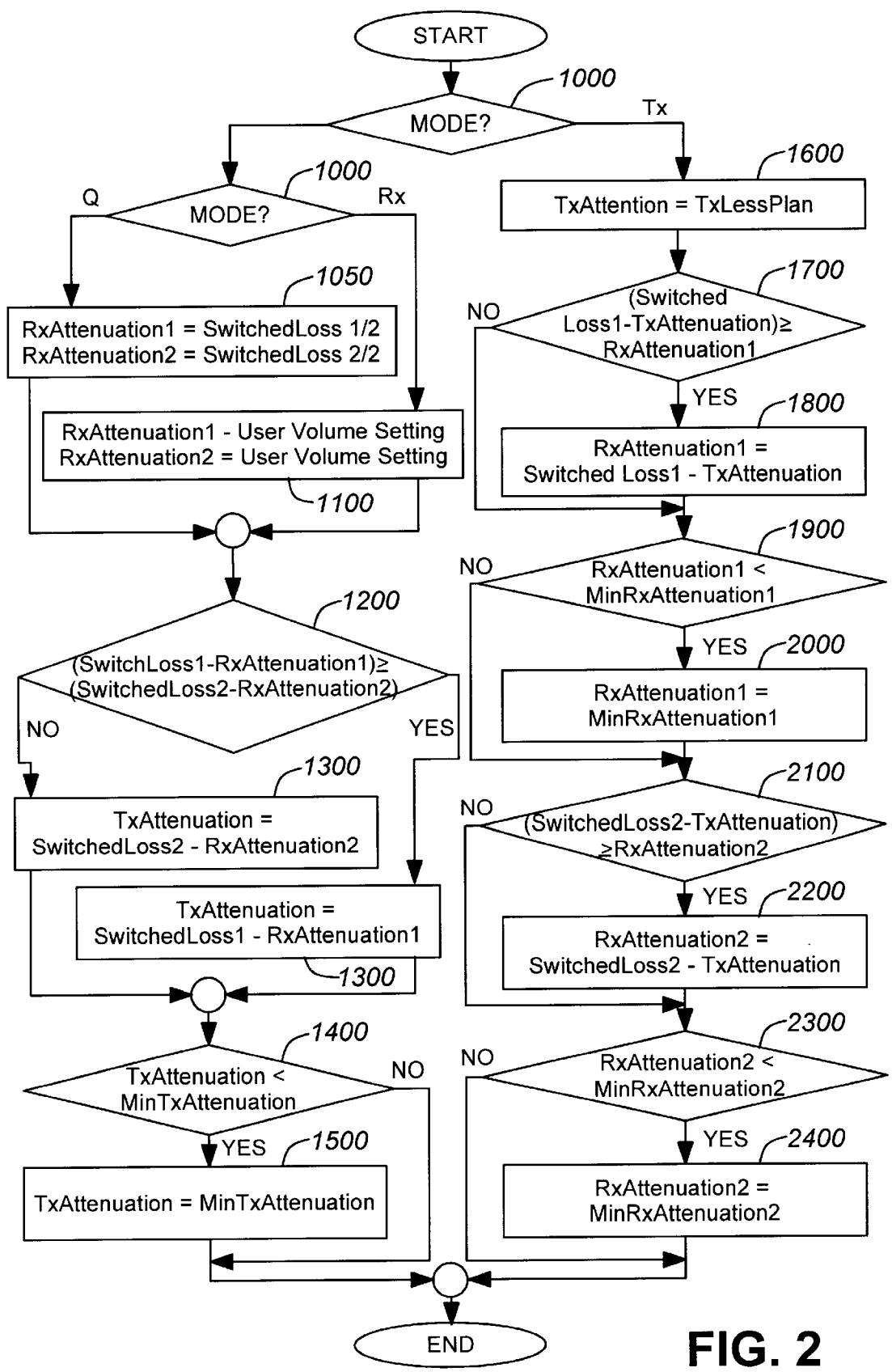
FIG. 2 is a flow diagram illustrating the process carried out by the voice-switching device according to a preferred embodiment.

In this embodiment, each output path includes a variolosser so that the amount of loss applied to each receive transducer, although dependent upon the transmitting loss level, is independent of the amount of loss applied to the other receive transducer. FIG. 2 outlines the voice-switching method implemented by the controller for adjusting the respective levels of loss according to a preferred embodiment of the invention. In FIG. 2, suffix 1 refers to the first output path/distinct receive transducer whereas suffix 2 refers to the second output path/distinct receive transducer. In the present example, these subscripts represent a handset and handsfree receive transducer respectively.

In operation, the voice-switching device determines the mode of operation 1000, i.e. transmit, receive or quiescent mode. This is accomplished by comparing the signal levels as determined by the speech detectors 20 and 40 and selecting the mode corresponding to the largest signal level. When the switching device enters receive mode the handset and handsfree receive variolossers (RxAttenuation1 and RxAttenuation2 respectively) are adjusted to provide the amount of loss required to meet a user-controlled volume setting for each respective receive transducer 1100. Then the amount of loss applied by the transmit variolosser to the transmit path (TxAttenuation) is determined. This involves the controller determining the difference between the switched loss value of each receive transducer (SwitchedLoss1 and SwitchedLoss2) and the corresponding receive variolosser settings 1200. The SwitchedLoss values are constants which are determined by system design requirements for echo control and stability. These values are easily determined by those skilled in the art. The controller then adjusts the amount of loss applied to the transmit path to the value of the largest aforementioned difference 1300. This loss value is then compared to a minimum threshold value (MinTxAttenuation) 1400. If the adjusted value of transmit loss is below the threshold value, then the loss is set to the threshold value 1500. Otherwise the adjusted value of transmit loss remains the same.

Although the described method in this embodiment is dependent upon a user-controlled volume setting this is not a necessary requirement and is merely included to offer the user increased flexibility. The described invention could easily be employed in a fixed volume telephone.

When the switching device enters quiescent mode, after determination of step 1000, the controller adjusts the transmit/receive variolosser pairs to be approximately half of the value of the respective SwitchedLoss for handset and handsfree modes.

When the switching device enters transmit mode, after the determination step 1000, the transmit variolosser is adjusted to insert the amount of loss necessary to meet the current loss plan (TxLossPlan) 1600. The TxLossPlan value is a system design parameter which is determined by the loudness-level requirements for the telephone set. This value is easily determined by one skilled in the art. After the transmit loss value is set, the controller determines the amount of loss that needs to be applied to each output path (1700–2400) as described below.

With reference to the handset receive transducer 120 the controller determines whether the current handset receive transducer loss setting (RxAttenuation1) is less than the difference between the handset switched loss value (SwitchedLoss1) and the transmit loss value (TxAttenuation) 1700. If said handset loss value is less then the aforementioned difference, the handset loss value is set to the value of the difference 1800. Otherwise, the handset loss value remains the same as the value on the previous algorithm iteration. The next step involves comparing the handset loss value to the minimum threshold value for the respective variolosser (MinRxAttenuation1) 1900. The MinRxAttenuation values are minimum settings allowable which are determined by system designer preferences or specific requirements for volume control range. If the handset loss value is below the threshold value, the handset loss is set to said threshold value. Otherwise the loss value remains unchanged.

Similarly, the controller determines whether the current handsfree receive transducer loss setting (RxAttenuation2) is less than the difference between the handsfree switched loss value (SwitchedLoss2) and the transmit loss value (TxAttenuation) 2100. If said handsfree loss value is less then the aforementioned difference, then the handsfree loss value becomes the value of the difference 2200. Otherwise the handsfree loss value remains the same. The handsfree loss value is then compared to a minimum threshold value (MinRxAttenuation2) 2300. If said loss value is below the threshold value, then the handsfree loss value becomes the threshold value 2400.

The above calculations to determine TxAttenuation, RxAttenuation1 and RxAttenuation2 are contained in a subsection of a module (the voice-switching algorithm) that is executed on a periodic basis when a call is in progress.

Thus the amount of switched loss is independently applied to each receive transducer depending on the values necessary to prevent each receive transducer from becoming unstable.

It should be noted that the above description is not exhaustive. For example one can see that the present invention could easily be extended to include additional distinct receive transducer by extending the method described above. Furthermore, more than one receive path can be used.

As another alternative, it should be noted that the above invention can be modified to include applying an optimum amount of switched loss to a device with a plurality of transmit transducers. This can be accomplished by pre-mixing the transmitted signals prior to transmission. Thus, the switched loss levels applied to the various receive output paths would be based on the pre-mixed transmit signal.

Numerous modifications, variations and adaptations may be made to the particular embodiments of the invention described above without departing from the scope of the invention, which is defined in the claims.

What is claimed is:

1. A method for varying the inserted switched loss of a terminal having a transmit path, a receive path, and a plurality of output paths, said method comprising the steps of:
   sampling the transmit and receive paths to determine the presence and magnitude of speech signals;
   determining the mode of operation of said terminal responsive to said sampling; and
   adjusting the value of the switched loss applied to the transmit path and each output path separately responsive to determining the mode of operation;
   wherein said mode of operation includes:
      a transmit mode;
      a receive mode; and
      a quiescent mode; and
   wherein the step of determining the mode of operation includes:
      identifying transmit mode when speech signals present on the transmit path are greater than those present on the receive path; and
      identify receive mode when speech signals present on the receive path are greater than those present on the transmit path; and
      identifying quiescent mode when no speech signals are present on either the receive or transmit paths; and
      wherein the step of adjusting the value of the switched loss includes determining the amount of loss necessary to compensate for the output path which provides the greatest amount of coupling with the transmit path.

2. The method as claimed in claim 1 wherein the step of adjusting the loss value while in receive mode includes setting the output path loss values to correspond with the user volume settings, and setting the transmit path loss value to a value dependent on dominant receive transducer.

3. The method as claimed in claim 2 wherein the step of adjusting the loss value while in quiescent mode includes setting the amount of loss applied to each output path to approximately half of the switched loss value associated with each output path, and setting the transmit path loss value to a value dependent on the dominant receive transducer.

4. The method as claimed in claim 3 wherein the step of adjusting the amount of loss while in transmit mode includes setting the amount of loss applied to the transmit path to the loss value required to meet the loudness-level requirement of said terminal and setting the amount of loss applied to each output path to a value dependent on the transmit loss value and a value associated with each output path.

5. The method as claimed in claim 4 wherein the step of setting the transmit path loss value to a value dependent on the dominant receive transducer includes determining the difference between the switched loss value and inserted loss value for each output path and setting the transmit path loss value to the value of the largest difference provided that value is greater than a threshold value, otherwise setting the transmit path loss value to the threshold value.

6. The method as claimed in claim 5 wherein the step of setting the amount of loss applied to each output path to a value dependent on the transmit loss value and a value associated with each output path includes setting the amount of loss applied to each output path to the smaller value of either the difference between the switched loss value for each respective output path and the transmit loss value or the current output path loss value provided that the amount of loss to be applied is greater than a threshold value, otherwise setting the respective output path loss value to the threshold value.

7. A telephone voice-switching device to improve audio quality in a telephone terminal, wherein said device comprises:
   a transmit path;
   a receive path;
   a plurality of output paths for connecting receiver transducers to the receive path;
   means for sampling the transmit and receive paths in order to identify the presence of speech signals;
   means for determining the mode of operation responsive to sampling the transmit and receive paths; and
   means for adjusting the value of the switched loss applied to the transmit path and each output path separately responsive to determining the mode of operation and responsive to determining the amount of loss necessary to compensate for the output path which provides the greatest amount of coupling with the transmit path.

8. A device as claimed in claim 7 wherein said means for sampling includes:
   a speech detector connected to the transmit path; and
   a speech detector connected to the receive path.

9. A telephone voice-switching device to improve audio quality in a telephone terminal comprising:
   a transmit path;
   a receive path;
   a plurality of output paths;
   a speech detector connected to the transmit path;
   a speech detector connected to the receive path;
   a variolosser connected to the transmit path;
   a separate variolosser connected to each receive output path; and
   a controller for controlling said variolossers responsive to detected speech signals by determining the amount of loss necessary to compensate for the output path which provides the greatest amount of coupling with the transmit path.

10. A telephone voice-switching device as claimed in claim 9 wherein said device operates in a transmit mode, a receive mode or a quiescent mode; and
   wherein said controller determines the mode of operation by:
      identifying transmit mode when speech signals present on the transmit path are greater than those present on the receive path; and
      identifying receive mode when speech signals present on the receive path are greater than those present on the transmit path; and
      identifying quiescent mode when no speech signals are present on either the receive or transmit paths;
      and wherein the controller adjusts the loss value:
         while in receive mode by setting the output path loss values to correspond with the user volume settings, and setting the transmit path loss value to a value dependent on dominant receive transducer;

while in quiescent mode by setting the amount of loss applied to each output path to approximately half of the switched loss value associated with each output path, and setting the transmit path loss value to a value dependent on the dominant receive transducer; and while in transmit mode by setting the amount of loss applied to the transmit path to the loss value required to meet the loudness-level requirement of said terminal and setting the amount of loss applied to each output path to a value dependent on the transmit loss value and a value associated with each output path.

11. A telephone voice-switching device as claimed in claim 10 wherein said controller sets the transmit path loss value to a value dependent on the dominant receive traducer by determining the difference between the switched loss value and inserted loss value for each output path and setting the transmit path loss value to the value of the largest difference provided that value is greater than a threshold value, otherwise setting the transmit path loss value to the threshold value; and wherein said controller sets the amount of loss applied to each output path to a value dependent on the transmit loss value and a value associated with each output path by setting the amount of loss applied to each output path to the smaller value of either the difference between the switched loss value for each respective output path and the transmit loss value or the current output path loss value provided that the amount of loss to be applied is greater than a threshold value, otherwise setting the respective output path loss value to the threshold value.

* * * * *